No. 12,159. REISSUED SEPT. 29, 1903.

S. F. PATTERSON.

POWER LOOM.

APPLICATION FILED AUG. 10, 1903.

5 SHEETS—SHEET 1.

Witnesses

E. H. Kaider

D. E. Burdine

Inventor:

Samuel F. Patterson,

By Dodge & Sons

Attorneys.

NORRIS PETERS, INC., LITHO., WASHINGTON, D. C.

No. 12,159. REISSUED SEPT. 29, 1903.

S. F. PATTERSON.

POWER LOOM.

APPLICATION FILED AUG. 10, 1903.

5 SHEETS—SHEET 2.

Witnesses

E. A. Sander

D. E. Burdine

Inventor;

Samuel F. Patterson,

By Dodger & Sons, Attorneys.

NORRIS PETERS, INC., LITHO., WASHINGTON, D. C.

No. 12,159.
REISSUED SEPT. 29, 1903.
S. F. PATTERSON.
POWER LOOM.
APPLICATION FILED AUG. 10, 1903.
5 SHEETS—SHEET 3.
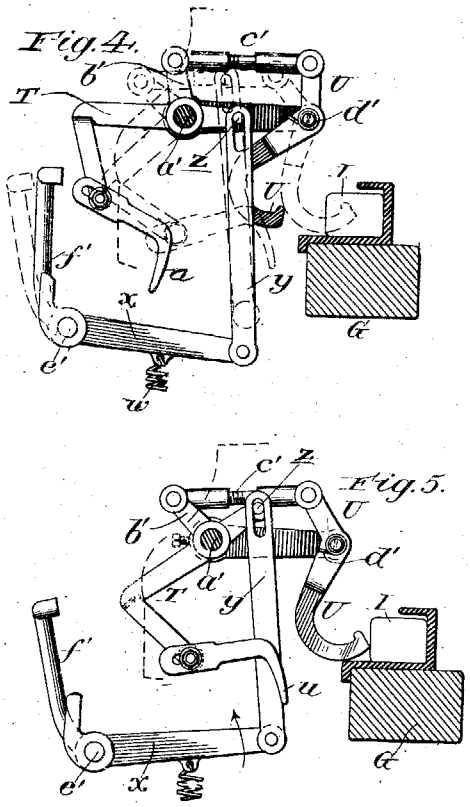
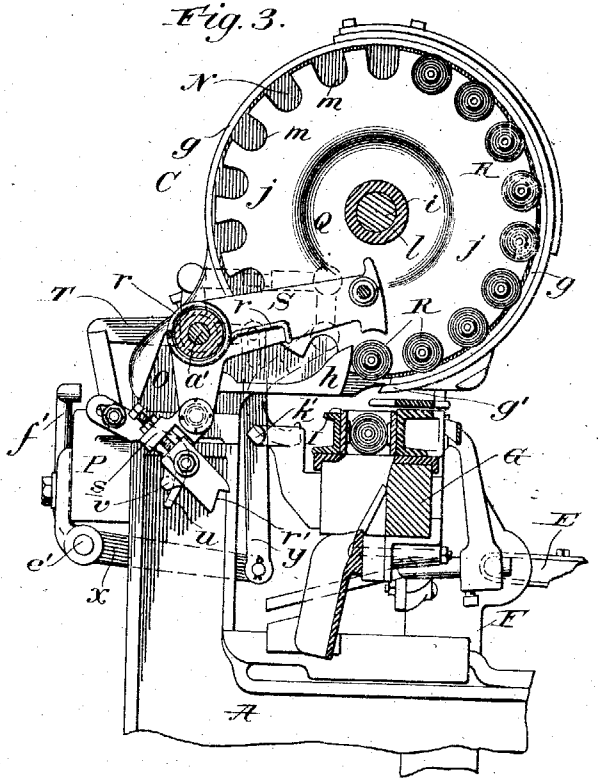
Witnesses
E. Pauder
D. C. Purdue
Inventor:
Samuel F. Patterson,
By
Dodge & Sons,
Attorneys.
NORRIS PETERS, INC., LITHO., WASHINGTON, D. C.

No. 12,159.

REISSUED SEPT. 29, 1903.

S. F. PATTERSON.

POWER LOOM.

APPLICATION FILED AUG. 10, 1903.

5 SHEETS—SHEET 4.

Witnesses

C. H. Bowden

D. E. Purdine.

Inventor:

Samuel F. Patterson,

By Dodge & Sons, Attorneys

NORRIS PETERS, INC., LITHO., WASHINGTON, D. C.

No. 12,159. REISSUED SEPT. 29, 1903.

S. F. PATTERSON.

POWER LOOM.

APPLICATION FILED AUG. 10, 1903.

5 SHEETS—SHEET 5.

Witnesses

E. F. Raeder

D. E. Burdine

Inventor:

Samuel F. Patterson,

By Dodger & Sons, Attorneys.

No. 12,159. Reissued September 29, 1903.

UNITED STATES PATENT OFFICE.

SAMUEL F. PATTERSON, OF BALTIMORE, MARYLAND.

POWER-LOOM.

SPECIFICATION forming part of Reissued Letters Patent No. 12,159, dated September 29, 1903.

Original No. 722,243, dated March 10, 1903. Application for reissue filed August 10, 1903. Serial No. 169,050.

*To all whom it may concern:*

Be it known that I, SAMUEL F. PATTERSON, a citizen of the United States, residing at the city of Baltimore, in the State of Maryland, have invented certain new and useful Improvements in Power-Looms, of which the following is a specification.

This invention pertains to power-looms; and it consists, primarily, in combining with the usual weaving apparatus or loom proper jacquard mechanism and automatic devices for renewing the filling in the shuttle whenever it becomes exhausted or when the filling thread or yarn breaks.

The invention further consists in certain novel features, details, and combinations hereinafter set forth, whereby the invention thus generally stated is efficiently embodied and carried into practice.

Figure 1:
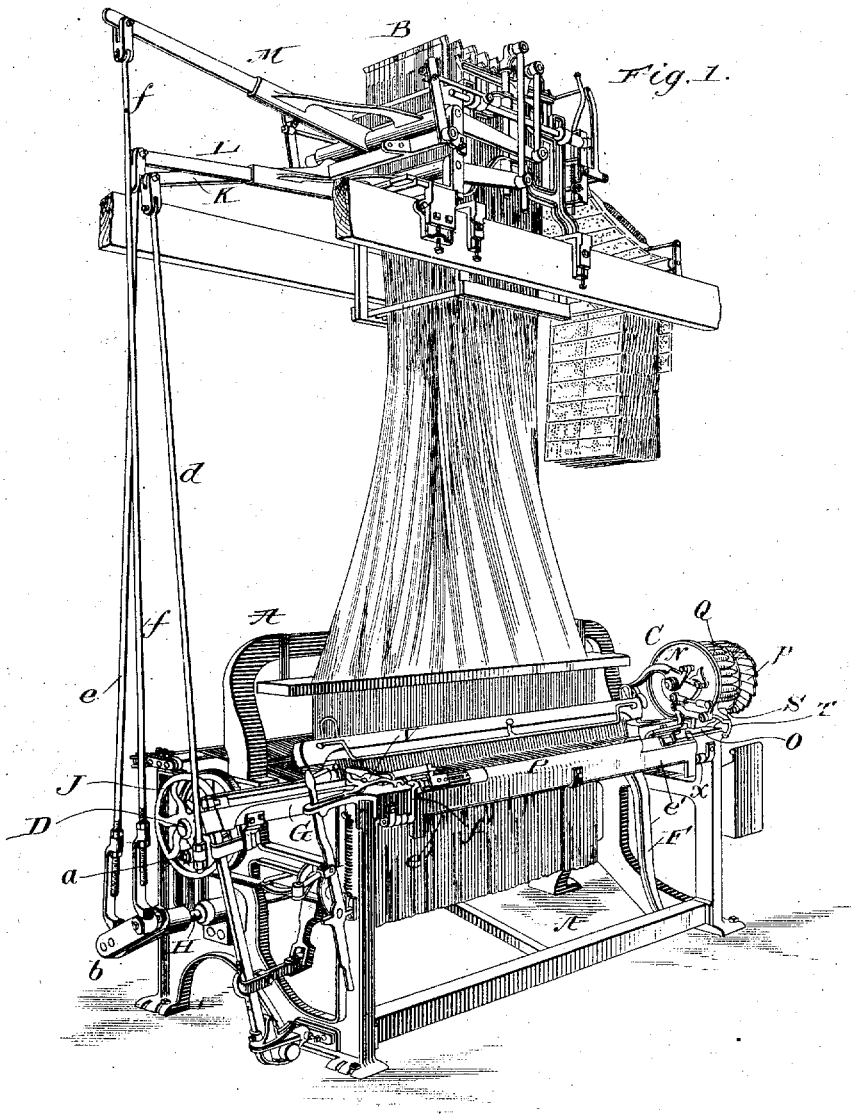
Figure 2:
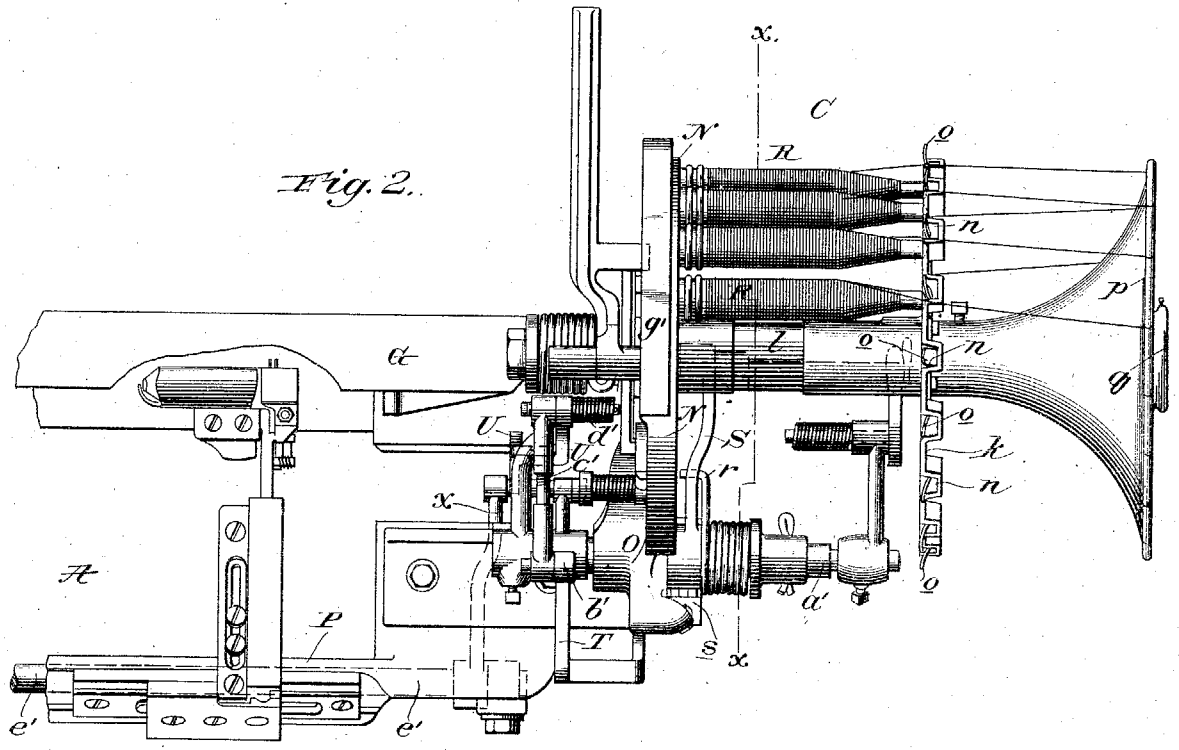
Figure 9:
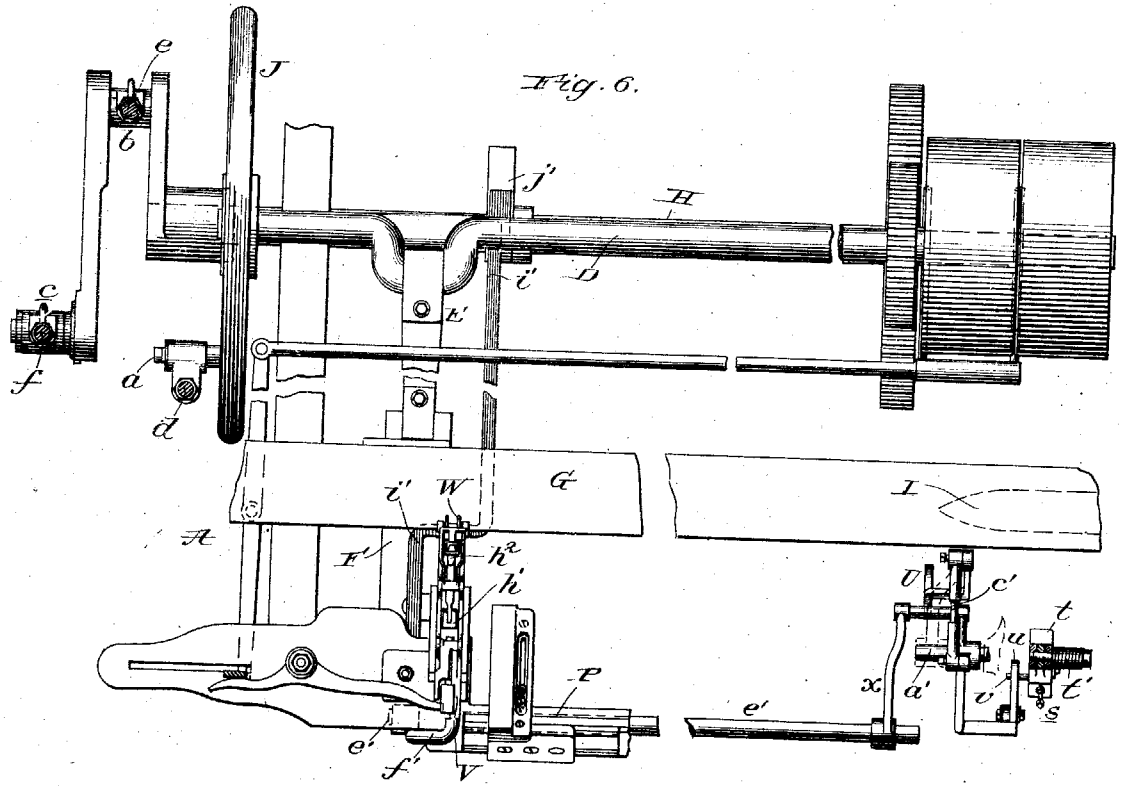

In the accompanying drawings, Figure 1 is a perspective view of a loom embodying my invention; Fig. 2, a top plan view of a portion thereof, showing more particularly the mechanism for supplying filling to the shuttle; Fig. 3, a vertical section on the line *x x* of Fig. 2; Figs. 4 and 5, detail views of the "detector" mechanism which serves to ascertain whether the shuttle is in proper position to receive a fresh bobbin, spindle, or cop and determines accordingly whether or not certain other parts shall go into operation; Fig. 6, a diagrammatic top plan view of the driving and controlling mechanism of the loom intended to show the general and relative arrangement of parts, and Fig. 7 a detail view of the feeler and latch mechanism.

Prior to my invention jacquard mechanism of different types or styles had long been employed in connection with looms to produce figure or pattern effects. So, too, but for a shorter time, automatic mechanism for introducing into the shuttle a fresh or filled bobbin, spindle, or cop when necessary had been combined with weaving mechanisms or looms proper adapted to produce plain fabrics only. Each of these attachments or appliances had its useful purpose and function and each added greatly to the efficiency or capabilities of the loom in one or another way. I have combined these several mechanisms in one structure, whereby the production of figured fabrics is greatly increased over the production of looms having jacquard mechanism used prior to my invention for making the same fabrics, and the cost of such production is thereby also decreased.

Referring again to the drawings and first to Fig. 1, A indicates the loom as a whole, B the jacquard mechanism, and C the automatic bobbin, spindle, or cop feeding mechanism, which constitute the main elements or groups of elements embraced in the novel combination constituting my invention.

In themselves the several mechanisms just indicated may be of any usual or approved construction, though I have selected and have represented in the drawings those types of each which I deem best suited to the purpose in view.

Referring now not only to Fig. 1, but to the other figures in which parts mentioned may be found, the loom A will be seen to comprise the usual frame provided with a crank-shaft D, the cranks of which connect by pitmen or connecting-arms E with the swords or carrying-arms F of the lay G, a picker-shaft H, with the usual cams, picker-sticks and intermediate picking-shaft, a shuttle I, and the customary harness, beams, &c., employed in a power-loom having jacquard mechanism.

The Draper loom, being one well and favorably known, is here taken as an illustrative type, the customary harness or heddle frames and mechanism for operating the same, however, being done away with and the customary harness of a power-loom having jacquard mechanism being introduced in place thereof.

It will be seen upon referring to Figs. 1 and 6 that the crank-shaft D is furnished at one end with a wheel J, having a crank-pin *a*, and that picker-shaft H is extended beyond its usual point of termination in looms of the class illustrated and furnished with a double crank *b c*. These several cranks *a*, *b*, and *c* are designed to actuate the jacquard mechanism, the crank-pin *a* being connected by an upright rod *d* with the lever K, which reciprocates or moves facewise the perforate prismatic box or so-called "cylinder" controlling the horizontal needles or cross-wires and the cranks *b* and *c* being connected by rods *e* and *f* with the levers L and M, which alternately elevate and lower the griffs or hook-lifters. Inasmuch as the jacquard mechanism *per se* constitutes no part of the present invention, further description of or reference to its separate parts is deemed unnecessary. The throw and the timing of the cranks *a*, *b*, and *c* are carefully proportioned and arranged with reference to the relations existing between the loom proper and the jacquard mechanism. The two shafts D and H are geared together and maintain the predetermined relation and times of action.

Figure 7:
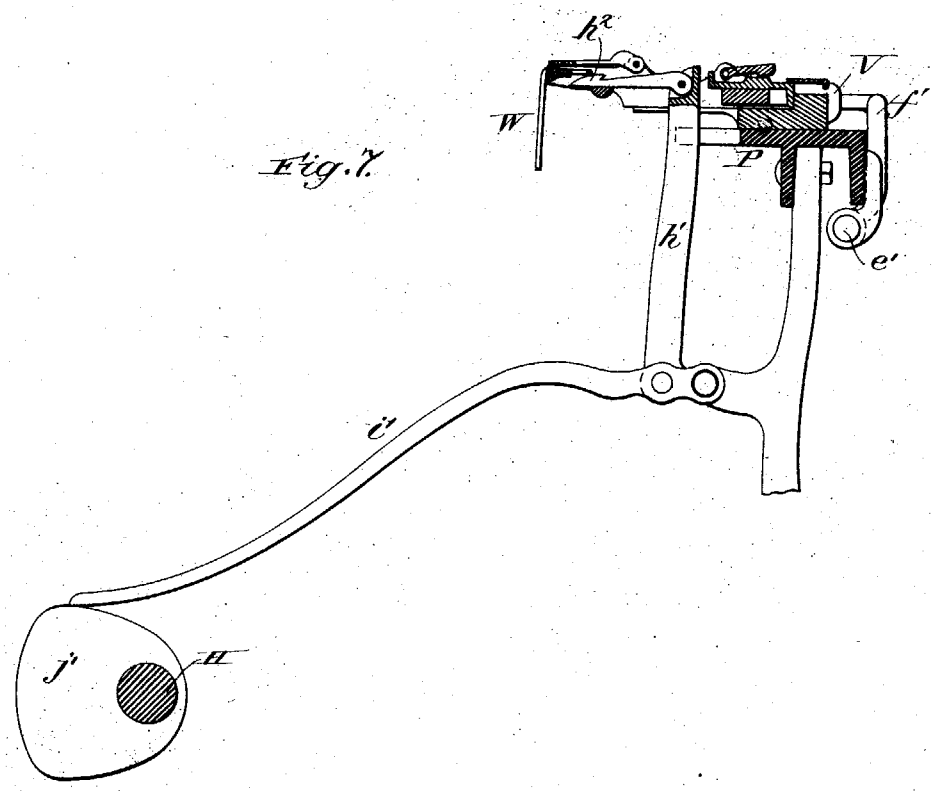

Figs. 2 and 3 illustrate the magazine or battery for holding a series of bobbins, spindles, or cops duly wound with the filling thread or yarn, together with the mechanism for forcing one bobbin, spindle, or cop from the magazine into the shuttle, and thereby displacing or ejecting a spent bobbin or filling-carrier or one the filling-thread of which has broken. This mechanism is of well-known construction and will be described only so far as may be useful or necessary to a clear understanding of the combination of the several groups of mechanisms above named. The magazine or battery comprises first a vertical plate or disk N, rising from a bracket O, bolted or otherwise made fast upon the breast-beam P and formed with an overhanging horizontal flange *g*, which extends nearly around the circumference of the disk, terminating at a point below and nearly in vertical line with the center of said disk and at a short distance from a stop or abutment *h*, formed upon the supporting-bracket or the plate itself. From the center of plate or disk N projects a horizontal stem or spindle *i*, which constitutes an axle for a drum or carrier Q, comprising a peripherally-notched disk or head *j* and a radially grooved or recessed disk or head *k*, connected and spaced by a tubular sleeve *l*, which fits and turns upon the spindle *i*. The notches *m* of the disk or head *j* are of a size and form to receive and hold the heads of the bobbins or spindles R, whose tips are carried in the radial grooves *n* of disk *k*. The heads are retained in position by the overhanging flange *g* and the tips are retained in the radial grooves *n* by curved spring-tongues *o*, secured in the grooves and projecting outwardly somewhat beyond the periphery of the disk *k*, so that they may be readily pressed back to permit insertion of a full bobbin or spindle. Projecting beyond disk *k* and concentric therewith is a supporting-plate *p* for the weft or filling threads of the several bobbins, spindles, or filling-carriers of the magazine or battery. The periphery of this supporting-plate is fashioned, essentially, like a ratchet-wheel, there being as many radial faces as there are grooves in the disk *k*. Concentric with and projecting slightly beyond support *p* is a boss or spool *q*, about which the ends of the filling-threads are wound after passing from the filling-carriers over the supporting-plate *p*. By being thus wound upon the boss or spool each thread or yarn is caused to draw from its spindle or carrier as the latter, inserted into the shuttle, is carried through the shuttle-race or across the lay. Between the termination of the guard or flange *g* and the stop or abutment *h* is left space sufficient for the passage of the head or enlarged end of a bobbin or spindle R. S indicates an ejector by which the bobbins, spindles, or cops are one at a time removed from the magazine or battery and delivered into the shuttle. This operation is effected at that instant when the shuttle is in its box at that end of the loom at which the magazine is located and when said box and its contained shuttle are immediately beneath the opening left between the flange *g* and abutment *h*, as indicated in Fig. 3. There is at this instant the brief dwell or momentary rest of the lay incident to the crank's passing the center and reversing the motion of the lay, and this is of course the most available time at which to remove one bobbin or spindle and insert another. The ejector S is pivotally supported upon the bracket or upright plate N, its inner end being held up by a spring *r* and occupying a position immediately over the lowermost spindle or bobbin R of the battery or magazine, as seen in Fig. 3. Carried by the lower arm of the ejector, which as a whole is in the form of an elbow-lever, is a swinging member *s*, upon which is adjustably mounted a notched block *t*. A spring *t'*, Fig. 6, coiled about the pivot by which the member *s* is attached to the ejector-arm, tends to swing the member *s* inward, and thereby to elevate the notched inner end of block *t*. This tendency is counteracted and normally overcome by a hook or finger *u*, adjustably secured to a depending arm of a T-shaped lever T, pivoted upon a stud or axle *a'*, projecting from the plate or upright N, said finger or hook *u* engaging a stud *v* on the block *t* or its carrier, as shown in Fig. 3. Hook or finger *u* occupies under different conditions the positions shown by full and dotted lines in Fig. 4 and by full lines in Fig. 5, its normal position being that shown by full lines in Figs. 3 and 4, so that the block *t* normally stands in the position shown in said Fig. 3. Hook or finger *u* is retained normally in said position through the stress of a spring *w*, acting through a lever *x* and link *y*, which latter is slotted at its upper end and hung upon a stud *z*, projecting from an arm of lever T on the opposite side of the pivot-axis of said lever from that of the arm which carries hook or finger *u*. A third arm *b'* rises vertically from lever T and is connected by a link *c'* with a detector-lever U, which normally occupies the position indicated by full lines in Fig. 4. This detector arm or lever is pivotally supported upon an arm or bracket of the magazine or battery frame and is carried to and held in the position indicated in Fig. 4 by a spring *d'*, coiled about the stud on which it is pivoted, fixed at one end to said stud and bearing at the other end against the lever U. Spring *d'* exerts force sufficient to swing the detector U and through it and link $c'$ the lever T and hook or finger $u$ to the positions indicated by dotted lines in Fig. 4, provided said parts be not restrained or held against the action of spring $d'$ by other means; but, as above indicated, spring $w$, acting through lever $x$ and link $y$, ordinarily exerts a preponderating force and holds the parts in the positions shown by full lines in Fig. 4. Lever $x$ is secured upon a rock-shaft $e'$, carried in hangers or bearings attached to the breast-beam P or to other convenient supports. The rock-shaft $e'$ extends across the front of the machine and carries at the end opposite that at which lever $x$ is located an upright arm $f'$. (Seen in Figs. 1, 3, 4, 5, 6, and 7.) The upper end of arm $f'$ is bent laterally and then inward, terminating just above the top face of the breast-beam and in position to be engaged by the filling-feeler slide V (on the breast-beam) when said slide is moved outward, as happens when the filling thread or yarn breaks or gives out. This slide is shown in Figs. 6 and 7 and carries at its inner end the pivoted filling-fork $w$, which as the lay swings outward encounters or is encountered by the filling-thread, if the same be present. The weft-fork is of the form shown in Fig. 7, comprising a horizontal member and a substantially vertical member, which latter lies in the path of the thread or filling as the lay swings outward. The horizontal or outer member of the fork is here shown in the form of a bail to engage a hook $h^2$, pin-jointed to the lever or "hammer" $h'$, carried and oscillated by the lever $i'$, in turn actuated by cam $j'$ on the shaft II. So long as the filling is uninterrupted through depletion or breakage it will on the outward throw of the lay encounter the weft-fork W and lift its horizontal member so as to prevent engagement with the hook $h^2$, and consequently prevent backward movement of the slide in or upon which the fork is pivoted. If, however, the thread or filling fail from any cause, the fork W will not be acted upon, and its horizontal portion being unlifted its bail will lie in the path of the hook $h^2$ and will in consequence engage said hook and cause the fork and the slide V, in which it is mounted, to be moved backward. In thus moving backward the slide encounters the arm $f'$ of rock-shaft $e'$, turning said shaft and lifting arm or lever $x$ and link $y$, overcoming in so doing the resistance or stress of spring $w$. Owing to the slotting of the link $y$ the lifting thereof does not in itself affect the three-arm lever T; but it leaves said lever free to be moved through its connection with the deflector U, actuated by spring $d'$. If the shuttle is properly positioned within the shuttle-box beneath the magazine at the time the hammer $h'$ swings outward and after failure of the weft thread or yarn, the elevation of link $y$ in the manner just described will be followed by the swinging of detector U to the position indicated by dotted lines in Fig. 4; but should the shuttle not be properly positioned within the box it would be encountered by the detector U, as in Fig. 5, and thus the parts would be precluded from reaching the position indicated by dotted lines in Fig. 4. Assuming that the shuttle has reached its proper position in the shuttle-box and that the weft-thread has failed, thereby bringing about a movement of the parts to the position indicated by dotted lines in Fig. 4, hook or finger $u$ will thereby have relieved stud $v$ of pressure and will have permitted the spring $t'$ to turn or swing the carrier $s$ and block $t$ to a position where the notch $r'$ in the end of said block will be in the path of a projection $k'$ on an arm carried by the lay G. When the block is brought to the position indicated, the horn or projection $k'$ encountering the block $t$ will cause the ejector S to swing about its pivot or axle, and thereby to press its head or ejecting portion against the spindle or bobbin of the magazine, which at that moment lies against the abutment or stop $h$. The movement of the ejector is such as to carry the bobbin or spindle out of the notch $m$ of the disk or head $j$ and out of the groove $n$ of disk $k$ and to force said bobbin downward into contact with the bobbin in the shuttle I. As is usual with this magazine or battery feeder, the shuttle is of the self-threading variety and is open at top and bottom and holds the bobbin by means of springs having slightly-concave seats to receive the circumferential rings or beads formed upon or applied to the head or enlarged end of the bobbin, so that the bobbin is free to enter at one side of the shuttle and leave at the opposite side, or, in other words, to pass directly through, if pressure be applied sufficient to overcome the holding-springs. The shuttle-box is likewise cut through at the bottom to permit the delivery through it of the ejected bobbin or spindle, as indicated in Fig. 3.

The usual devices for stopping the loom when a warp-thread breaks or when the shuttle does not reach its proper position at the end of the shuttle-box and a belt-shifter, brake, and like parts will or may be provided; but as these are of well-known construction it is not deemed necessary to enter into a further or more detailed description of them. The same is true of other details, such as the tip-support for the bobbin or spindle in position to be delivered from the magazine or carrier, the mechanism for rotating said carrier and arresting it at the proper point, &c. As to all these matters any suitable construction and arrangement known in the art may be employed—such, for instance, as used in the Northrop magazine or battery looms now extensively in use and illustrated in United States Letters Patent to J. H. Northrop, dated June 23, 1891, and numbered 454,810. The magazine may be the rotary type shown or of the hopper style.

As is usual, the overhanging flange $g$ is here represented as supplemented by or provided with a spring member $g'$, secured to the rigid flange $g$ and requiring the exertion of moderate force to press its end back sufficiently to permit escape of a bobbin, cop, or spindle from the rotary holder.

The take-up mechanism used in connection with the cloth-beam and the let-off mechanism used with the warp-beam are not shown in the drawings, and some other details not necessary to an understanding of the invention claimed are likewise omitted to avoid confusion.

In the foregoing description I have set forth, and I have illustrated in the drawings, one form of mechanism for replenishing the supply of weft thread or yarn, this involving the displacement of an empty bobbin, spindle, or cop from, and the introduction of a filled one into, the shuttle, and such apparatus I deem the most desirable to use in practice. My invention, however, includes the automatic replenishing or renewal of the weft-thread supply by any known form of mechanism when combined with the other features herein set forth. Thus, for instance, it comprehends automatic devices for ejecting a shuttle the weft-thread of which has become broken or exhausted and replacing the same by a shuttle containing a filled cop, bobbin, or spindle, or supplied with weft thread or yarn. The term "weft-carrier" is, therefore, used in a somewhat comprehensive sense in some of the claims and includes shuttles supplied with weft-thread, as well as bobbins, cops, or spindles, apart from the shuttles and similarly supplied.

Having thus described my invention, what I claim is-

1. In combination with the weaving mechanism proper of a loom, an automatic mechanism for supplying weft or filling to the shuttle; jacquard mechanism for controlling the harness of the loom; and intermediate connections between such mechanisms, substantially as described.

2. In combination with the weaving mechanism proper of a power-loom, jacquard mechanism for controlling and actuating the harness thereof; a magazine or battery for containing a supply of filled bobbins or spindles; mechanism for automatically ejecting an empty bobbin or spindle from the shuttle and delivering a filled one thereto; and connections, substantially such as shown and described, between said mechanisms.

3. In combination with the weaving mechanism proper of a power-loom having cranks $a$, $b$ and $c$; jacquard mechanism connected with and actuated by said cranks; and automatic mechanism for supplying filled bobbins or spindles to the loom-shuttle, substantially as described.

4. In combination with the weaving mechanism proper of a loom, automatic mechanism for supplying weft or filling to the loom when the weft-thread is interrupted or exhausted; jacquard mechanism for controlling the harness of the loom; and intermediate connections between such mechanisms, substantially as described.

5. In combination with the weaving mechanism proper of a power-loom, jacquard mechanism for controlling and actuating the harness thereof; a magazine or battery for containing a supply of weft-carriers; mechanism for automatically ejecting an empty carrier and delivering a filled one; and connections, substantially such as shown and described, between said mechanisms.

6. In combination with the weaving mechanism proper of a power-loom having cranks $a$, $b$ and $c$, jacquard mechanism connected with and actuated by said cranks; and automatic mechanism for ejecting empty weft-carriers and supplying filled ones, substantially as described.

In testimony whereof I have signed my name to this specification in the presence of two subscribing witnesses.

SAMUEL F. PATTERSON.

Witnesses:

WILLIAM W. DODGE,
HORACE A. DODGE.